United States Patent [19]

Suzuki

[11] Patent Number: 4,641,022

[45] Date of Patent: Feb. 3, 1987

[54] RANGE FINDING DEVICE WITH A SPATIAL LOW-PASS FILTER

[75] Inventor: Takashi Suzuki, Yokohama, Japan

[73] Assignee: Canon Kabushiki Kaisha, Tokyo, Japan

[21] Appl. No.: 287,699

[22] Filed: Jul. 28, 1981

[30] Foreign Application Priority Data

Aug. 5, 1980 [JP] Japan .................... 55-107397

[51] Int. Cl.⁴ ................ G01J 1/20; G03B 3/10
[52] U.S. Cl. .................... 250/204; 250/201; 354/404; 354/407; 354/408
[58] Field of Search ........... 250/201, 204, 209, 578, 250/216, 550; 354/25 R, 25 N, 31 F, 195, 404, 406, 407, 408, 409; 352/140; 355/56; 356/4

[56] References Cited

U.S. PATENT DOCUMENTS 4,027,970 6/1977 Misek .................... 354/25 X
4,047,022 9/1977 Holle .................... 250/201
4,352,545 10/1982 Uno et al. .................... 250/204 X

OTHER PUBLICATIONS

J. W. Goodman, *Introduction To Fourier Optics* (McGraw-Hill: 1968) pp. 101–120.

*Primary Examiner*—Edward P. Westin
*Attorney, Agent, or Firm*—Fitzpatrick, Cella, Harper & Scinto

[57] ABSTRACT

A trigonometric range finding device is provided which detects a focal point by comparing image readout signals of two rows of digital sensors. The range finding device incorporates an optical low-pass filter inserted between the lens and digital sensor rows for lowering the MTF (modulation transfer function) of the spatial frequency component of the image which is higher than the spatial frequency component corresponding to the pitch of the digital sensors arranged in rows, so that erratic operation of the range finding device may be prevented.

9 Claims, 7 Drawing Figures

RANGE FINDING DEVICE WITH A SPATIAL LOW-PASS FILTER

BACKGROUND OF THE INVENTION

1. Field of the Invention

The present invention relates to a focus detection device. More specifically, the present invention relates to a focus detection device wherein two or more rows of digital (meaning "discrete") sensors of a predetermined pitch are arranged in the focal plane of a photographic lens for forming an image of a subject on a photographic material in such a manner that the respective rows of digital sensors may read substantially the same location of the subject when focusing is achieved, and the respective rows of digital sensors may read different locations of the subject when focusing is not achieved, thereby detecting whether or not focusing has been achieved by the presence or absence of the difference between the readout signals of the respective rows of digital sensors.

2. Description of the Prior Art

Various focus detection devices of the type described above have been proposed. Some typical examples will first be described.

FIG. 1 shows an optical system for detecting whether or not focusing has been achieved by dividing the image into two divided images by a split prism, receiving each image which may be in or out of focus at a set of sensors arranged in a row, and comparing the outputs of the respective rows of sensors. Referring to FIG. 1, an image 4 of a subject 1 is vertically divided by a split prism $3_1$, $3_2$ disposed in the focal plane of a photographic lens 2. Divided images $4'_1$ and $4'_2$ of the image 4 are guided through a relay lens 5 to a row of photosensors $6_{11}, 6_{12}, 6_{13}, \ldots$ and another row of photosensors $6_{21}, 6_{22}, 6_{23}, \ldots$, respectively. Whether focusing has been achieved or not is determined according to whether or not the divided images $4'_1$ and $4'_2$ (these are the divided images corresponding to substantially the same location of the image, although they differ in vertical location but occupy the same position in the transverse direction) of the image 4 coincide each other.

In this system, parts of the subject differing in vertical location are detected by the two rows of sensors when focusing is achieved and the common part of the subject corresponding to the overlapping of the image is detected by these two rows of sensors. As an improvement over this system, an invention was made according to which the split prism is divided into two stages to vertically divide the image (Laid-open Japanese Patent Application No. 53-143315). FIG. 2 shows a system for detecting (by photoelectric conversion elements) the same part of the subject when focusing is achieved and different parts of the subject when focusing is not achieved. Referring to FIG. 2, rays forming the image 4 of the subject 1 converge at a focal plane F from the photographic lens 2. A pair of convex lenses $7_1$ and $7_2$ is arranged behind the focal plane F. Photoelectric conversion elements $5_{11}$ and $5_{21}$ are arranged at optically equivalent positions of the images formed by this pair of convex lenses. Whether or not focusing has been achieved is judged by comparing the outputs from these two photoelectric conversion elements (Laid-open Japanese Patent Application No. 54-7323). A plurality of pairs of convex lenses and photoelectric conversion elements may alternatively be incorporated. FIG. 2 shows the condition under which focusing is not achieved.

FIG. 3 shows an improvement over the system shown in FIG. 2.

Referring to FIG. 3, the image 4 of the subject 1 focused is formed by the photographic lens 2 on rows of fly-eye lenses $8_1$, $8_2$, ... This image becomes incident on a pair of sensors $5_{11}$ and $5_{21}$ arranged behind the respective fly-eye lenses after being transmitted therethrough. In practice, the same number of pairs of sensors $5_{11}, 5_{12}, 5_{13}, \ldots, 5_{21}, 5_{22}, 5_{23}, \ldots$ as the number of fly-eye lenses are used, and the outputs of the respective pairs of sensors are compared to judge whether or not (focal point is deviated to the front or to the back of the depth of field) focusing is achieved (U.S. Pat. No. 4,185,191).

The optical feature common to all three examples described above is that at least one pair of sensors detects the same depth of field irrespective of whether or not the same location of the object space is detected. Another common feature is that, as the sensor arrangement, a CCD (charge-coupled device), a CID (charge injection device) or the like may preferably be adopted.

The present invention relates to an optical low-pass filter which may be applied to all these systems as described above and which has important functions that may even determine the practicality of these systems.

The applicant of the present invention has proposed a focus detection device which operates by detection of overlapping images. The device is different from the respective systems as described above and uses a CCD line sensor. It has been found that, with this proposed system, when the subject moves or the system is moved while the MTF of the optical system for forming an image on the sensor plane is high, the image flickers on the sensor plane. Especially with a subject with high contrast, for example, an edge chart of black and white, the electrical signal processing becomes difficult. A focus detection device which has optical low-pass filter effects for solving this problem is now proposed.

This problem will first be described in more detail referring to FIGS. 4 and 5.

The upper graph of FIG. 4 shows the intensity distribution I(x) of the edge image formed on a series of sensors $S_1$, $S_2$, ... wherein curve $I_1$ represents an intensity distribution $I(t_1)$ at a time $t_1$ and curve $I_2$ represents an intensity distribution $I(t_1 + \Delta t)$ at a time $t_1 + \Delta t$. Although the pitch p of the sensors is about 0.05 to 0.2 mm, the image on the sensors is easily displaced by one pitch during a very short period of time due to movement of the subject, movement of the system or the like, and curves $I_1$ and $I_2$ overlap.

The lower graph of FIG. 4 shows a video signal V(x). The video signal V(x) abruptly changes from level $V_1$ to level $V_2$ for the sensor $S_7$. Since such abrupt output changes occur for sensors of the other series, the signal processing cannot follow the flickering of the input signals (flickering of the intensity distribution of the sensors) when comparing by complex signal processing the signals from the two series of sensors for judging whether or not (focal point is deviated to the front or to the back of the depth of field) focusing is achieved. This results in erratic operation.

Even if the signal processing follows the flickering, the display lamp, which signals whether or not focusing is achieved, tends to flash.

As shown in FIG. 5, when image data having a finer structure than the sensor pitch is input and when there is a shift in the position (phase) of the image relative to the sensors, different outputs are obtained for the same image. Thus, the two graphs out of four at the right of FIG. 5 show the case when the phases of the image on the sensors are shifted from each other upon reception of the input (image intensity distribution) by the sensors. The two graphs at the left of FIG. 5 show the sensor output values of the respective cases.

When it is assumed that the outputs of adjacent sensors are added and compared or processed, different output values are obtained for the same image data:

$$V = \Delta V_1 + \Delta V_1 = 2\Delta V_1$$

for the upper graphs and $$V = \Delta V_2 + \Delta V_2 = 2\Delta V_2 = \Delta V_1$$

for the lower graphs.

In order to moderate such a difference in the output values, for a high resolution optical system wherein the leading or trailing edge is less than half the sensor pitch as shown in FIG. 4 or an image is formed having a finer structure than the sensor pitch, the resolution may be lowered so that the leading or trailing edge may become about the same as the sensor pitch or greater. An optical low-pass filter is used for lowering the resolution of sensors of high resolution optical systems.

Various types of optical low-pass filters are known, especially the type which are arranged in front of the image pickup tube of a television camera. These include, for example, various types of diffraction gratings of the amplitude or phase type, random dot filters (amplitude or phase type), lenticular lenses, fiber plates, birefringence parallel plates, or the like.

SUMMARY OF THE INVENTION

It is an object of the present invention to provide a trigonometric focus detection device which incorporates an optical low-pass filter to function in the manner as described above.

DESCRIPTION OF THE PREFERRED EMBODIMENT

Figure 1:
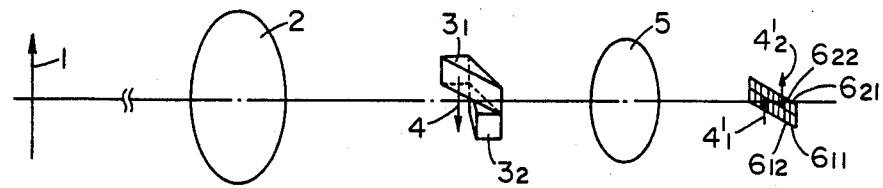
FIG. 1 is a view showing a focus detection system using a split image.
Figure 2:
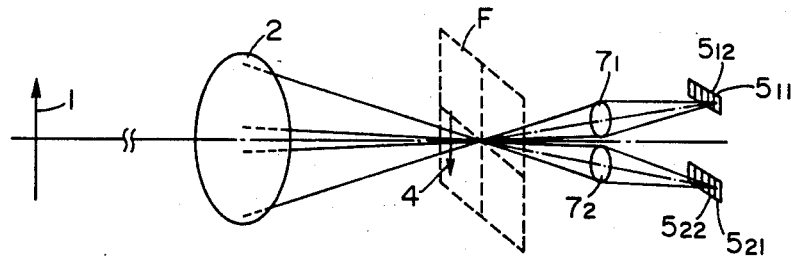
FIG. 2 is a view showing a focus detection system using a relay optical system.
Figure 3:
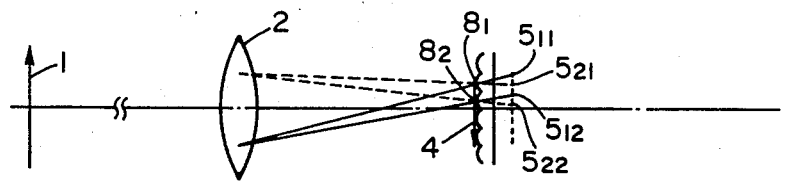
FIG. 3 is a view showing a focus detection system using fly-eye lenses.
Figure 4:
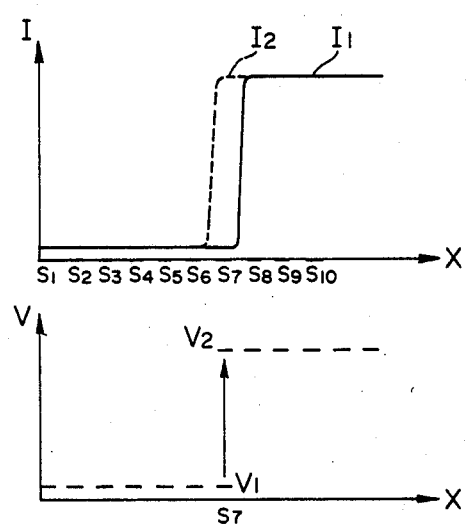
FIGS. 4 and 5 are views for explaining the problems associated with a focus detection device using rows of digital sensors.
Figure 5:
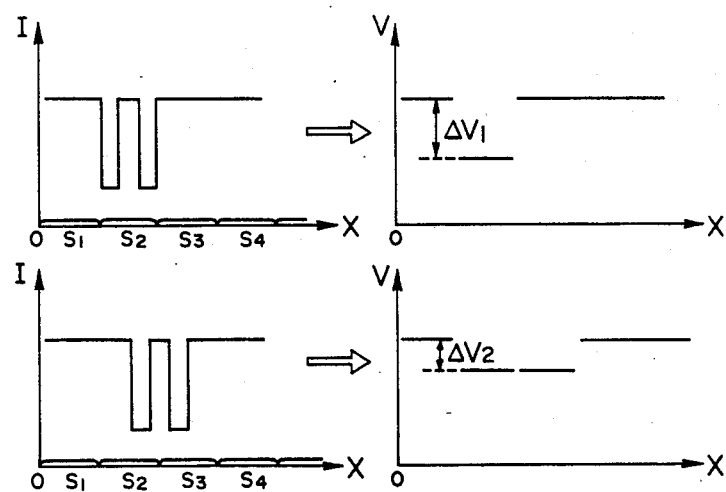
Figure 6:
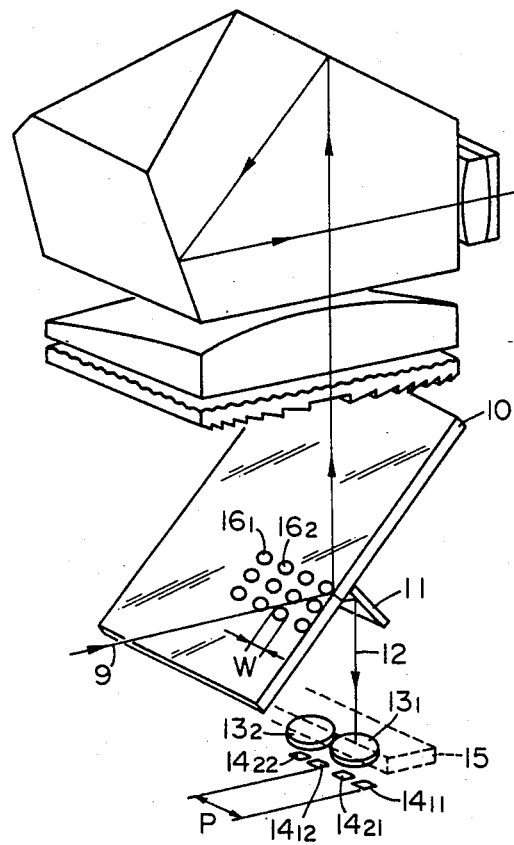
FIG. 6 is a view showing an arrangement of an embodiment of the present invention.

The embodiment of the present invention will now be described with reference to FIG. 6. This embodiment adopts the system shown in FIG. 3. FIG. 6 shows an embodiment where the focus detection device of the present invention is applied to a single reflex camera. A light ray 9 transmitted through the photographic lens passes through transparent parts $16_1$, $16_2$, ... on a quick-return mirror 10 and is thereafter reflected downward by a sub-mirror 11 as a reflected light ray 12 which forms an image on fly-eye lenses $13_1$, $13_2$, $13_3$, ... Paired sensors ($14_{11}$, $14_{21}$), ($14_{12}$, $14_{22}$), ($14_{13}$, $14_{23}$), ... are arranged behind the respective fly-eye lenses. One series of sensors $14_{11}$, $14_{12}$, $14_{13}$, ... detects one image, and the other series of sensors $14_{21}$, $14_{22}$, $14_{23}$, ... detects the other image. Whether or not (focal point is deviated to the front or to the back of the depth of field) focusing has been achieved is detected by comparing the image data of the respective series of sensors. It is usually the conventional practice to make the region of a quick-return mirror 10 translucent so that light transmitted therethrough may become incident on a submirror to be guided to the optical system for detecting the state of focus. However, in the embodiment of the present invention, a variable-area type mirror is adopted wherein the width in the direction along the arrangement of the sensors is W, so that the mirror may have the spectral characteristics of a quick-return mirror and the optical low-pass filter function for the optical system for detecting the state of focus. The width W of the transparent part of the quick-return mirror is determined by the magnitude of the MTF with the light ray incident on the fly-eye lenses $13_1$, $13_2$, ... The important factor is how to control a particular spatial frequency determined by the sensor pitch p or the fly-eye lens pitch p' (p≃p'), that is, how to control the MTF at $\frac{1}{2}$p (or $\frac{1}{2}$p'). The optical system for detecting an image having such a pitch is incapable of correctly resolving an image of a spatial frequency higher than the Nyquist frequency f=$\frac{1}{2}$p (≃$\frac{1}{2}$p'). Considering this, a very good MTF at the spatial frequency $\frac{1}{2}$p is not necessary, and a suitably small value is preferable when taking the phenomena shown in FIGS. 4 and 5 into consideration.

When it is assumed p≃p'=0.1 mm, the Nyquist frequency is 5 lines/mm. When it is assumed that W=0.3 mm with reference to FIG. 5 and the mean distance between the surface of the quick-return mirror 10 and the fly-eye lenses $13_1$, $13_2$, ... is 20 mm, the MTF in the direction of arrangement of the sensors becomes 0.7 (70%) when f=$\frac{1}{2}$p=5 lines/mm and 0.4 (40%) when f=1/p=10 lines/mm. In this case, approximately two sensors are within the leading or trailing edge. The optical low-pass filter may lower the MTF at a spatial frequency 1/p to 0.5(50%). If W=0.15 mm, the MTF is about 0.4 when f=5 lines/mm and 0.2 when f=10 lines/mm. In this case, the number of sensors within the leading or trailing edge is approximately 3 to 4. In either case, it was confirmed that the phenomena described with reference to FIG. 4 were considerably eliminated. Patterns $16_1$, $16_2$, ... on the surface of the quick-return mirror 10 may be of circular or rectangular shape and may be oblong in the longitudinal or transverse direction. They also be arranged regularly or irregularly.

Figure 7:
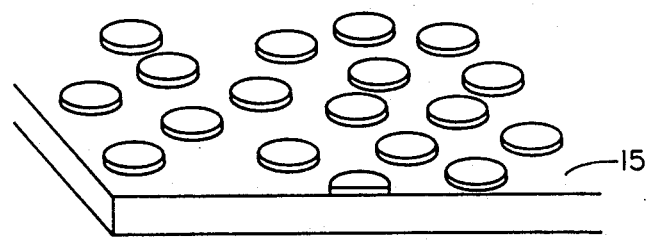
FIG. 7 is a view showing an optical low-pass filter.

A three-dimensional pattern as shown in FIG. 7 may alternatively be formed on the surface of the sub-mirror 11 shown in FIG. 6. Furthermore, a transparent phase plate as shown in FIG. 7 may be disposed immediately in front 15 of the fly-eye lenses $13_1$, $13_2$, ...

It is to be understood that various other known optical low-pass filters including birefringence parallel plates or the like may also be used according to the present invention in place of the optical low-pass filters of the particular embodiment described above.

What I claimed is:
1. A range finding device comprising:
   an imaging lens for forming an image of a subject on a photosensitive material;
   at least two rows of discrete sensors of a predetermined pitch disposed substantially at a focal plane of said imaging lens, each of said rows of sensors reading substantially the same location of the subject when focusing is achieved and substantially different locations of the subject when focusing is not achieved; and optical low-pass filter means disposed between said imaging lens and said rows of sensors for lowering a modulation transfer function (an MTF) at a spatial frequency component corresponding to said predetermined pitch so that the MTF is lowered as compared with an MTF at the spatial frequency component in a case where no optical low-pass filter means is provided.

2. A device according to claim 1, wherein said optical low-pass filter means comprises filter means which lowers the MTF at a spatial frequency 1/p to 0.5 where p is said predetermined pitch of said rows of sensors.

3. A device according to claim 1 or 2, wherein an optical element is disposed between said imaging lens and said rows of sensors, and said optical low-pass filter means is disposed on said optical element.

4. Apparatus for use in a camera auto focus system having a primary lens for directing radiation from a remote object along a path through a beam splitter to a mirror for reflection to a plurality of lenslets each operable to produce an image of the exit pupil of the primary lens on a pair of detectors located behind each lenslet, the radiation containing high spatial frequency components which may cause undesirable operation of the system, comprising:

radiation filter means mounted in the path and operable to suppress the high spatial frequency components.

5. Apparatus according to claim 4 wherein the radiation filter means suppresses high spatial frequency components between the beam splitter and the mirror.

6. Apparatus according to claim 4, wherein the radiation filter is formed as a part of the beam splitter.

7. Apparatus according to claim 4 wherein the filter operates to deflect the radiation passing therethrough by an amount necessary to cause the radiation normally falling on one of the lenslets to also fall on the two lenslets adjacent to the one of the lenslets.

8. Apparatus according to claim 7 wherein the filter has a controlled irregular surface.

9. Apparatus according to claim 7 wherein the filter is made of narrow segments having different spacing.

* * * * *